(12) United States Patent
Goto

(10) Patent No.: US 8,697,793 B2
(45) Date of Patent: Apr. 15, 2014

(54) RUBBER COMPOSITION FOR USE IN TIRES

(75) Inventor: Yoshihiro Goto, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 640 days.

(21) Appl. No.: 12/727,792

(22) Filed: Mar. 19, 2010

(65) Prior Publication Data

US 2011/0226395 A1   Sep. 22, 2011

(51) Int. Cl.
  *C08K 5/01* (2006.01)
(52) U.S. Cl.
  USPC .......................................... 524/476; 524/493
(58) Field of Classification Search
  USPC ................................................ 524/476, 493
  See application file for complete search history.

(56) References Cited

U.S. PATENT DOCUMENTS

| | | | |
|---|---|---|---|
| 2004/0158003 A1* | 8/2004 | Ruckel et al. | 525/333.3 |
| 2004/0254301 A1* | 12/2004 | Tsukimawashi et al. | 525/271 |
| 2007/0123636 A1* | 5/2007 | Hattori et al. | 524/515 |
| 2008/0223494 A1* | 9/2008 | Amino et al. | 152/209.1 |
| 2010/0224301 A1* | 9/2010 | Sakamoto et al. | 152/547 |

FOREIGN PATENT DOCUMENTS

JP   2002-201203   7/2002

* cited by examiner

*Primary Examiner* — Peter D Mulcahy

(74) *Attorney, Agent, or Firm* — Thorpe, North & Western LLP

(57) ABSTRACT

A rubber composition for use in tires is described which provides increased fuel efficiency and improved wet grip performance. The rubber composition includes from 5 to 70 parts by mass of silica having a BET specific surface area from 50 to 200 $m^2/g$ per 100 parts by mass of a diene rubber. The rubber composition includes from 1 to 25 parts by mass of an aromatic modified terpene resin and at least one terpene per 100 parts by mass of a diene rubber. The rubber composition further includes from 1 to 70 parts by mass of a naphthenic oil per 100 parts by mass of a diene rubber, where a CN % proportion of a CA %·CP %·CN % ratio calculated according to ASTM D2140/ASTM D3238 is the greatest and the CA % proportion is less than 15%, and a dynamic viscosity at 40° C. is from 17 to 30 $mm^2/sec$.

14 Claims, 1 Drawing Sheet

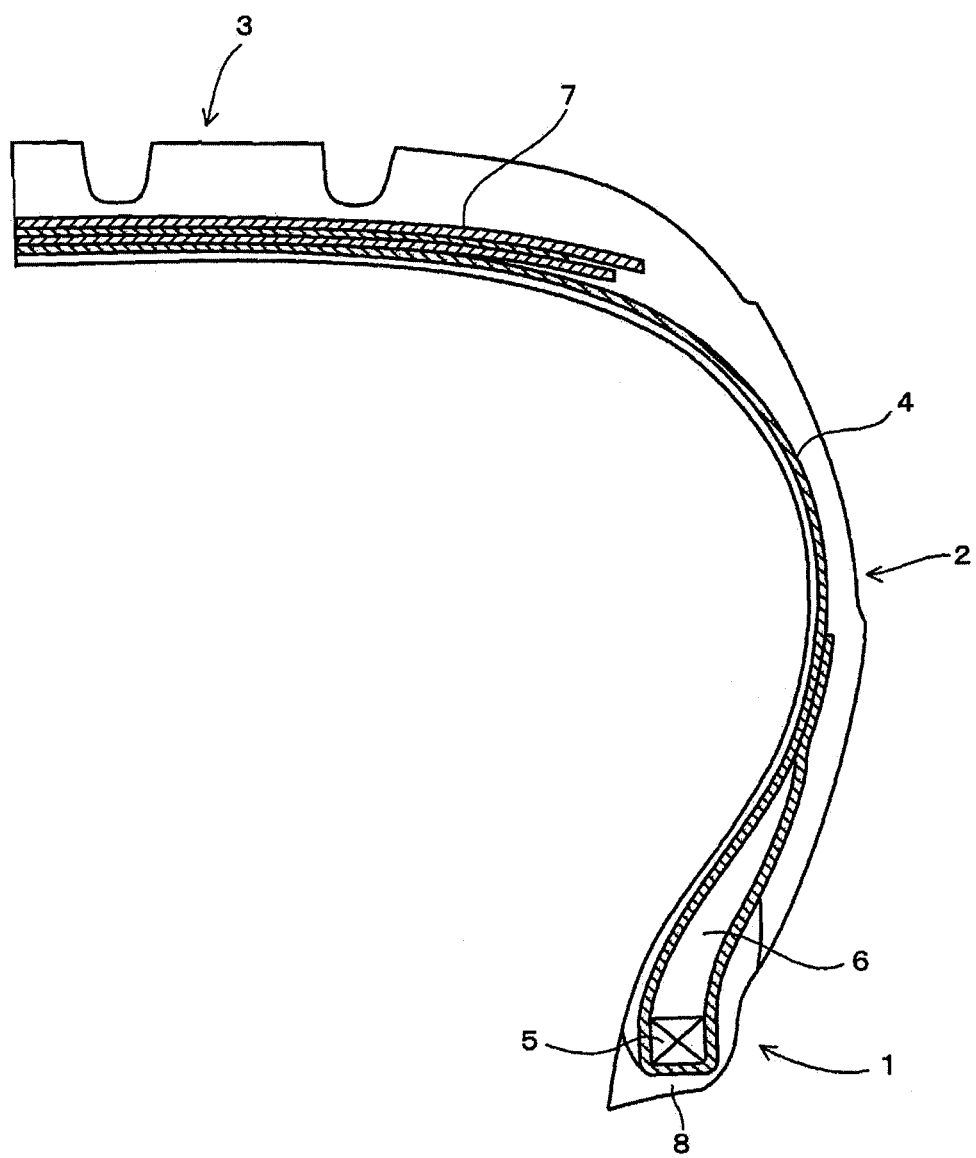

RUBBER COMPOSITION FOR USE IN TIRES

TECHNICAL FIELD

The present invention is related to a rubber composition for use in tires and is particularly related to a rubber composition for use in tires which is fuel efficient and has improved grip performance.

BACKGROUND ART

In recent years, there has been a desire for more environmentally friendly tires as a result of increasing concern about a worsening of the global environment.

Low rolling resistance, or low fuel consumption, can be an important performance factor for environmentally friendly tires. At the same time, however, it may be desirable for grip performance, particularly grip performance on wet road surfaces, to be equivalent or greater than that of conventional tires in order to ensure safety. (Grip performance on wet road surfaces can also be representative of acceleration and braking performance). However, low rolling resistance and grip performance can be conflicting performance goals and achieving both can be a technically difficult issue.

The present inventors have observed that, for example, Japanese Unexamined Patent Application No. 2009-138157, an aromatic modified terpene resin can be compounded to achieve an object of improving wet grip performance.

SUMMARY OF THE INVENTION

An object of the present invention is to provide a rubber composition for use in tires that simultaneously improves wet grip performance while suppressing fuel consumption.

The present invention is described below. The present invention provides a rubber composition for use in tires which includes from 5 to 70 parts by mass of silica having a BET specific surface area from 50 to 200 $m^2/g$ per 100 parts by mass of a diene rubber. The composition includes from 1 to 25 parts by mass of an aromatic modified terpene resin obtained by polymerizing an aromatic compound and at least one terpene per 100 parts by mass of a diene rubber. The terpene can be selected from the group consisting of α-pinene, β-pinene, dipentene, and limonene. The composition can further include from 1 to 70 parts by mass of a naphthenic oil per 100 parts by mass of a diene rubber where a CN % proportion of a CA %·CP %·CN % ratio calculated according to ASTM D2140/ASTM D3238 is the greatest and the CA % proportion is less than 15% and the dynamic viscosity of the naphthenic oil at 40° C. can be from 17 to 30 $mm^2/sec$.

In accordance with a more detailed embodiment, the aromatic compound used in the modification of the aromatic modified terpene resin is at least one compound selected from the group consisting of styrene, a-methylstyrene, vinyl toluene, and indene.

In accordance with a more detailed embodiment, the rubber composition may be formed as a tire, or more particularly may be used in the tread of a pneumatic tire.

EFFECT OF THE INVENTION

The present inventors, as a result of diligent research, discovered that both low rolling resistance and high wet grip performance can be achieved by compounding a specific silica and aromatic modified terpene resin and a specific naphthenic oil in a diene rubber.

BRIEF DESCRIPTION OF THE DRAWINGS

FIG. 1 is a partial cross-sectional view of an example of the pneumatic tire according to an embodiment of the present invention.

BEST MODE FOR CARRYING OUT THE INVENTION

The present invention is explained in further detail below.

FIG. 1 is a partial cross-sectional view of an example of a pneumatic tire for a passenger vehicle according to an embodiment of the present invention. In FIG. 1, the pneumatic tire is shown being formed from a pair of right and left bead portions 1 (left bead portion not shown), a pair of right and left side walls 2 (left side wall not shown), and a tread 3 extending between both side walls 2. A carcass layer 4 embedded with fiber cords is mounted between the bead portions 1. An end of the carcass layer 4 is folded over and up from a tire inner side to a tire outer side around a bead core 5 and a bead filler 6. In the tread 3, a belt layer 7 is provided along an entire periphery of the tire on an outer side of the carcass layer 4. Additionally, rim cushions 8 are provided in parts of the bead portions 1 that are in contact with a rim.

The rubber composition of the present invention described below is especially useful in the tread 3.

Diene Rubber

Any rubber that can be compounded in a tire tread-use rubber composition may be used as a diene rubber component for use in the present invention. For example, natural rubber (NR), isoprene rubber (IR), butadiene rubber (BR), styrene-butadiene copolymer rubber (SBR), acrylonitrile-butadiene copolymer rubber (NBR), and the like comprise a few example rubbers which may be used. One of these may be used alone, or two or more may be used in a combination. Additionally, a molecular mass and a microstructure of the diene rubber component is not particularly limited and may by terminally modified by an amine, amide, silyl, alcoxysilyl, carboxyl, or hydroxyl group or the like, or may be epoxidated.

Among these, from a perspective of effectiveness for purposes of the rubber composition described herein, 50 mass % or more of SBR is preferably compounded as the diene rubber component.

Silica

From 5 to 70 parts by mass and preferably from 10 to 70 parts by mass of a silica that has a BET specific surface area, measured according to ASTM D1993-03, of from 50 to 200 $m^2/g$ and preferably from 60 to 190 $m^2/g$ can be used as the silica for use in the rubber composition.

It is preferable to use a silica having the BET specific surface area in this range in order to reduce the rolling resistance of the rubber composition.

It is not preferable that a compounded amount of the silica exceeds 70 parts by mass, because the rolling resistance will increase.

Silane Coupling Agent

In order to improve properties of the silica and to improve dispersability of the silica in the diene rubber (silicas have low affinity with rubber polymers and silica-silica interaction forms hydrogen bonds in rubber through silanol groups which have properties that lower the dispersability of silica in rubber), a silane coupling agent may be used in a proportion of from 2 to 15 weight % and preferably from 3 to 10 weight % with respect to a weight % of the silica.

A polysulfide silane coupling agent having an alcoxysilyl group that reacts with a silanol group of a silica surface, and a sulfur chain that reacts with a copolymer such as bis(3-(triethoxysilyl)propyl)tetrasulfide, bis(2-(triethoxysilyl)ethyl)tetrasulfide, bis(3-(trimethoxysilyl)propyl)tetrasulfide, bis(3-(triethoxysilyl)propyl)disulfide, and the like can preferably be used as the silane coupling agent. It is not preferable that a usage proportion of the silane coupling agent be less than 2 weight %, because the properties of the silica and the dispersability of the silica in the diene rubber will not be sufficiently exhibited. Likewise, it is not preferable that the usage proportion be greater than 15 weight %, because processability will worsen.

Aromatic Modified Terpene Resin

Additionally, an aromatic modified terpene resin obtained by polymerizing a terpene such as α-pinene, β-pinene, dipentene, limonene, and the like, and an aromatic compound such as styrene, α-methylstyrene, vinyl toluene, indene, and the like can be effectively used as the aromatic modified terpene resin for compounding and use in the tire-use rubber composition of the present invention.

An included amount of the aromatic compound in the aromatic modified terpene resin is preferably from 10 to 50 mass %. By compounding the aromatic modified terpene resin in the diene rubber, wet grip performance of the rubber composition can be improved because compatibility between the resin and the diene rubber will be better.

A compounded amount of from 1 to 25 parts by mass and preferably from 2 to 25 parts by mass of the aromatic modified terpene resin is used. It is not preferable that the compounded amount be less than 1 part by mass, because a desired wet performance will not be attainable. Likewise, it is not preferable that the compounded amount exceed 25 parts by mass, because rolling resistance will increase.

Oil

A naphthenic oil that is commonly used as a plasticizer in rubber compositions is formed from an aromatic hydrocarbon, a paraffin hydrocarbon, and a naphthenic hydrocarbon. With the naphthenic oil for use in the rubber composition of the present invention, when weight percentages of carbons that form the aromatic hydrocarbon, the paraffin hydrocarbon, and the naphthenic hydrocarbon are calculated according to ASTM D2140/ASTM D3238 and expressed as CA %, CP %, and CN %, respectively, the CN % proportion is the greatest and the CA % proportion is less than 15%; and a dynamic viscosity at 40° C. measured according to JIS K2283 is from 17 to 30 mm2/sec. By compounding such a naphthenic oil it is possible to further reduce rolling resistance in comparison to when using a process oil with a higher aromatic hydrocarbon ratio.

Additionally, because the dynamic viscosity at 40° C. is from 17 to 30 mm$^2$/sec, mixing of the rubber composition is more stable and the effects of the naphthenic oil can be sufficiently displayed.

A compounded amount of from 1 to 70 parts by mass and preferably from 1.5 to 70 parts by mass of the naphthenic oil is used. If the compounded amount of the naphthenic oil exceeds 70 parts by mass, grip performance will worsen.

Filler

In addition to the silica, any type of filler can be compounded in the tire-use rubber composition of the present invention. The filler is not particularly limited and may be selected as necessary. Fillers such as carbon black, inorganic fillers, and the like can be mentioned. For example, clay, talc, calcium carbonate, and the like can be mentioned as the inorganic fillers.

Among these, carbon black is preferable.

As the carbon black to be used, use of an amount of 90 parts by mass or less of a carbon black having a nitrogen specific surface area ($N_2SA$), measured according to JIS K6217-2, of from 50 to 140 m$^2$/g can be mentioned as a preferred application.

It is preferable to use a carbon black having a $N_2SA$ in this range as this can increase the rolling resistance-reducing effect of the tire-use rubber composition of the present invention.

The tire-use rubber composition of the present invention can also include vulcanization or cross-linking agents, vulcanization or cross-linking accelerating agents, antiaging agents, and other various types of compounding agents generally compounded into tire-use rubber compositions. The compounding agents can be mixed according to a general method to form a rubber composition and vulcanize or cross-link the rubber composition. Conventional, general amounts of the compounding agents may be added so long as the object of the present invention is not adversely affected.

EXAMPLES

The present invention is explained in further detail below using examples and comparative examples, but the scope of the present invention is, of course, by no means limited to these examples.

Preparation of Samples

Rubber, carbon black/silica, and other components (except the sulfur and the vulcanizing accelerating agent) according to formulations (parts by mass) shown in Table 1 were loaded into a 1.7 L size B Banbury mixer and mixed for five minutes. The sulfur and the vulcanizing accelerating agent were added to the obtained master batch and kneading with an open roll was performed to obtain the rubber compositions.

Next, the rubber compositions were press vulcanized for 20 minutes at 160° C. in a predetermined die. Test samples (rubber sheets) were formed and were subjected to the following tests.

Test Methods

1) Wet grip performance: In accordance with Japanese Industrial Standard (JIS) K6394, a viscoelastic spectrometer (manufactured by Toyo Seiki Seisakusho, Co., Ltd.), was used to measure a tan δ (0° C.) under the following conditions: initial distortion=10%; amplitude=±2%, frequency=20 Hz. The measurements were then used to evaluate wet grip performance. The results are shown as an index with a comparative example 1 being 100. Larger index values indicate superior wet grip performance.

2) Rolling resistance: In accordance with JIS K6394, a viscoelastic spectrometer (manufactured by Toyo Seiki Seisakusho, Co., Ltd.), was used to measure a tan δ (60° C.) under the following conditions: initial distortion=10%; amplitude=±2%, frequency=20 Hz. The measurements were then used to evaluate rolling resistance. The results are shown as an index with the comparative example 1 being 100. Smaller index values indicate superior rolling resistance, and thus superior fuel efficiency performance.

Examples and Comparative Examples

The results of the present invention are shown in Table 1.

TABLE 1

| Components | Ex. 1 | Ex. 2 | CE 1 | CE 2 | CE 3 | CE 4 | CE 5 | CE 6 | CE 7 | CE 8 | CE 9 | CE 10 | CE 11 | CE 12 | CE 13 | CE 14 |
|---|---|---|---|---|---|---|---|---|---|---|---|---|---|---|---|---|
| SBR[1] | | 100 | 100 | 100 | 100 | 100 | 100 | 100 | 100 | 100 | 100 | | 100 | 100 | 100 | 100 |
| SBR[2] | 137.5 | | | | | | | | | | | 137.5 | | | | |
| CB[3] | 40 | 40 | 80 | 80 | 40 | 80 | 40 | 40 | 40 | 80 | | 40 | 40 | 40 | 40 | 40 |
| Silica[4] | 40 | 40 | | | 40 | | 40 | 40 | 40 | | 80 | 40 | 40 | | 40 | 40 |
| Silica[5] | | | | | | | | | | | | | | 40 | | |
| Terpene resin[6] | 5 | 15 | | | | 15 | 15 | 15 | | 15 | 15 | 15 | 30 | 15 | | 15 |
| Terpene resin[7] | | | | | | | | | | | | | | | 15 | |
| Naphthenic oil[8] | 20 | 15 | | 30 | | | | 30 | 15 | 15 | 40 | 5 | 15 | 15 | | |
| Naphthenic oil[9] | | | | | | | | | | | | | | | | 15 |
| Paraffin oil[10] | | | | | | 15 | | | | | | | | | | |
| Aromatic oil[11] | | | 30 | | 30 | 15 | | 15 | | | | | | | | |
| ZnO[12] | 3 | 3 | 3 | 3 | 3 | 3 | 3 | 3 | 3 | 3 | 3 | 3 | 3 | 3 | 3 | 3 |
| Stearic Acid[13] | 1 | 1 | 1 | 1 | 1 | 1 | 1 | 1 | 1 | 1 | 1 | 1 | 1 | 1 | 1 | 1 |
| Antiaging agent[14] | 2 | 2 | 2 | 2 | 2 | 2 | 2 | 2 | 2 | 2 | 2 | 2 | 2 | 2 | 2 | 2 |
| Wax[15] | 2 | 2 | 2 | 2 | 2 | 2 | 2 | 2 | 2 | 2 | 2 | 2 | 2 | 2 | 2 | 2 |
| Silane coupling agent[16] | 3 | 3 | | | 3 | | 3 | 3 | 3 | | 6 | 3 | 3 | 3 | 3 | 3 |
| Sulfur[17] | 2 | 2 | 2 | 2 | 2 | 2 | 2 | 2 | 2 | 2 | 2 | 2 | 2 | 2 | 2 | 2 |
| Vulcanizing acceleration agent[18] | 3 | 3 | 3 | 3 | 3 | 3 | 3 | 3 | 3 | 3 | 3 | 3 | 3 | 3 | 3 | 3 |
| Oil Content Total | 57.5 | 15 | 30 | 30 | 30 | 15 | 15 | 15 | 30 | 15 | 15 | 77.5 | 5 | 15 | 15 | 15 |
| Grip performance (0° C. tanδ) | 103 | 105 | 100 | 94 | 98 | 107 | 95 | 105 | 92 | 106 | 98 | 97 | 111 | 103 | 96 | 103 |
| Rolling resistance (60° C. tanδ) | 95 | 97 | 100 | 91 | 98 | 104 | 98 | 102 | 89 | 102 | 96 | 98 | 108 | 102 | 98 | 101 |

Notes to Table 1:
Components are listed in units of PHR. The abbreviations used in the column headings are as followings: "Ex." is an abbreviation of "Example"; and "CE" is an abbreviation of "Comparative Example".
[1]Non-oil-extended SBR. Nipol 1502 (manufactured by Zeon Corporation) SBR (Tg: −54° C.)
[2]Naphthenic oil-extended SBR. SBR1712HN (manufactured by ISP Elastomers) 37.5% oil extension (oil component: CA = 9%, CP = 45%, CN = 46%; dynamic viscosity at 40° C. = 20 mm$^2$/sec)
[3]SEAST 7HM (manufactured by Tokai Carbon Co., Ltd.) Nitrogen specific surface area = 126 m2/g
[4]Ultrasil VN3G (manufactured by Degussa) BET specific surface area = 171 m$^2$/g
[5]Nipsil AQ (manufactured by TOSOH SILICA CORPORATION) BET specific surface area = 215 m$^2$/g
[6]Aromatic modified terpene resin. YS Resin TO125 (manufactured by YASUHARA CHEMICAL CO., LTD.) Aromatic modified terpene resin (Terpene: dipentene and limonene; Modified aromatic compound: styrene-containing)
[7]Unmodified terpene resin. YS Resin PX200 (manufactured by YASUHARA CHEMICAL CO., LTD.) Terpene resin (not modified)
[8]FK 1150N (manufactured by Fuji Kosan Co., Ltd.) CA = 12%, CP = 40%, CN = 48%; dynamic viscosity at 40° C. = 22 mm$^2$/sec
[9]Shintak N-80 (manufactured by KOBE OIL CHEMICAL INDUSTRIAL Co., Ltd.) CA = 13%, CP = 41%, CN = 46%; dynamic viscosity at 40° C. = 464 mm$^2$/sec
[10]Flexon 848 (manufactured by Exxon Mobil) CA = 5%, CP = 65%, CN = 30%; dynamic viscosity at 40° C. = 25 mm$^2$/sec
[11]Extract No. 4S (manufactured by Showa Shell Sekiyu, Co., Ltd.) CA = 28%, CP = 48%, CN = 24%; dynamic viscosity at 40° C. = 45 mm$^2$/sec
[12]Zinc Oxide Type 3 (manufactured by Seido Chemical Industry Co., Ltd.)
[13]Beads Stearic Acid (manufactured by NOF Corporation)
[14]Santflex 6PPD (manufactured by Flexsys)
[15]SANNOC (manufactured by Ouchi Shinko Chemical Industrial)
[16]Si69 (manufactured by Degussa)
[17]"Golden Flower" Oil Treated Sulfur Powder (manufactured by Tsurumi Chemical)
[18]NOCCELER CZ-G (manufactured by Ouchi Shinko Chemical Industrial)

According to the results shown in Table 1, it can be seen that the rubber composition of the present invention simultaneously improves both wet grip performance and rolling resistance (fuel efficiency performance).

In contrast, the comparative examples that do not satisfy the requirements of claim 1 of the present application do not exhibit improvement in rolling resistance and/or wet grip performance over the comparative example 1, which is formulated with a generally used aromatic oil (11) that has been conventionally used in tires.

What is claimed is:

1. A rubber composition for use in tires, comprising a diene rubber and:
   from 5 to 70 parts by mass of silica having a BET specific surface area from 50 to 200 m$^2$/g;
   from 1 to 25 parts by mass of an aromatic modified terpene resin obtained by polymerizing an aromatic compound and at least one terpene selected from the group consisting of α-pinene, β-pinene, dipentene, and limonene; and from 1.5 to 70 parts by mass of a naphthenic oil where a CN % proportion of a CA %·CP %·CN % ratio calculated according to ASTM D2140/ASTM D3238 is the greatest and the CA % proportion is less than 15%; and a dynamic viscosity at 40° C. is from 17 to 30 mm$^2$/sec;

per 100 parts by mass of the diene rubber.

2. The rubber composition according to claim 1, wherein the aromatic compound used in the modification of the aromatic modified terpene resin is indene.

3. The rubber composition according to claim 1, wherein the aromatic modified terpene resin comprises from 2 to 25 parts by mass per 100 parts by mass of the diene rubber.

4. The rubber composition according to claim 1, wherein the aromatic compound comprises from 10 to 50 mass % per 100 parts by mass of the diene rubber.

5. The rubber composition according to claim 1, wherein the silica comprises from 10 to 70 parts by mass per 100 parts by mass of the diene rubber.

6. The rubber composition according to claim 1, wherein the BET specific surface area comprises from 60 to 190 m$^2$/g.

7. The rubber composition according to claim 1, further comprising a silane coupling agent used in a proportion of from 2 to 15 weight % with respect to a weight % of the silica.

8. The rubber composition according to claim 7, wherein the silane coupling agent comprises from 3 to 10 weight % with respect to a weight % of the silica.

9. The rubber composition according to claim 1, wherein the diene rubber comprises multiple different rubbers where at least 50 mass % of the diene rubber is styrene-butadiene copolymer rubber.

10. The rubber composition according to claim 1, further comprising a carbon black filler.

11. The rubber composition according to claim 10, wherein the carbon black filler comprises 90 parts by mass or less per 100 parts by mass of the diene rubber.

12. The rubber composition according to claim 10, wherein the carbon black filler comprises a nitrogen specific surface area of from 50 to 140 m$^2$/g, measured according to Japanese Industrial Standard K6217-2.

13. A rubber composition for use in tires, comprising:
from 10 to 70 parts by mass of silica having a BET specific surface area from 60 to 190 m$^2$/g;
from 2 to 25 parts by mass of an aromatic modified terpene resin obtained by polymerizing an aromatic compound and at least one terpene selected from the group consisting of α-pinene, β-pinene, dipentene, and limonene; and
from 1.5 to 70 parts by mass of a naphthenic oil where a CN % proportion of a CA %·CP %·CN % ratio calculated according to ASTM D2140/ASTM D3238 is the greatest and the CA % proportion is less than 15%; and a dynamic viscosity at 40° C. is from 17 to 30 mm$^2$/sec;
per 100 parts by mass of a diene rubber.

14. A pneumatic tire comprising the rubber composition according to claim 1 in a tread portion of the pneumatic tire.

\* \* \* \* \*